Oct. 13, 1953     H. N. BURROUGHS     2,655,579
MERCURY SWITCH
Filed July 31, 1950

Inventor
Howard N. Burroughs
By
Shoemaker & Mattare
Attorneys

Patented Oct. 13, 1953

2,655,579

UNITED STATES PATENT OFFICE 2,655,579

MERCURY SWITCH

Howard N. Burroughs, Clarksville, Iowa

Application July 31, 1950, Serial No. 176,862

1 Claim. (Cl. 200—152)

The invention relates to a mercury switch.

An object of the present invention is to provide a simple practical and comparatively inexpensive specialized mercury switch of strong and durable construction designed to be wired in a horizontal position on an automobile or other automotive vehicle, a tractor or other motor propelled machine, and comprising a conical cup forming a mercury container and having spaced contact plates or portions insulated from each other and electrically connected with binding posts, one of which is connected with the primary circuit of a conventional ignition system and the other grounded, the mercury within the conical cup operating to electrically connect said contact plates or portions for the purpose of grounding the primary circuit when the automobile or other motor vehicle or machine to which the switch is applied departs a predetermined number of degrees from a horizontal position, either laterally or longitudinally, thereby stopping the engine and eliminating to a large extent fires in overturned automobiles and preventing the accidental overturning of tractors due to sudden draw bar overloads or attempting to negotiate excessive gradients. Since no external spark is caused by the closing of the mercury switch and the grounding of the primary circuit the possibility of fire caused by an ignition spark is completely eliminated.

Another object of the invention is to provide a mercury switch of this character adapted to be readily connected by one of its binding posts to one end of a small metal supporting bracket having at such end a hole to receive said binding post and provided at its other end with a hole for enabling it to be conveniently attached to the binding post of the primary circuit on the magneto of a tractor or the ignition coil of an automobile or other vehicle.

With the above and other objects in view, the invention consists in the construction and novel combination and arrangement of parts hereinafter fully described, illustrated in the accompanying drawings and pointed out in the claim hereto appended, it being understood that various changes in the form, proportions, and minor details of construction, within the scope of the claim, may be resorted to without departing from the spirit or sacrificing any of the advantages of the invention.

Figure 1:
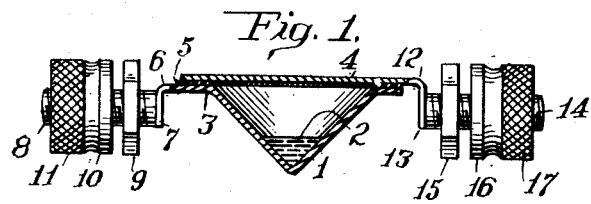
Fig. 1 is a vertical sectional view of a mercury switch constructed in accordance with this invention, the binding posts being shown in elevation.
Figure 2:
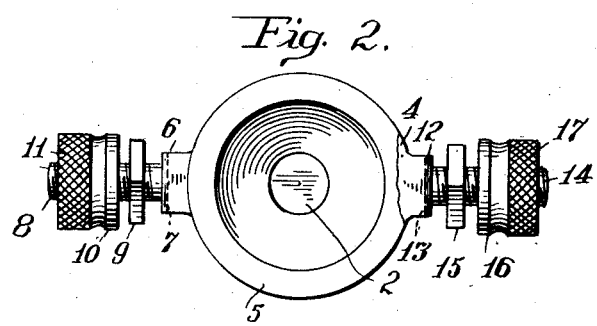
Fig. 2 is a plan view of the same, the body portion of the cover plate being omitted in order to show the annular insulation and the pool of mercury.
Figure 3:
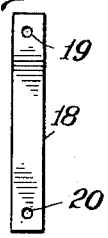
Fig. 3 is a detail plan view of the supporting bracket.

In the accompanying drawing in which is illustrated a preferred embodiment of the invention, the mercury switch comprises in its construction a conical cup 1 constructed of suitable metal and forming a container for a pool 2 of mercury which normally occupies the lower portion of the conical container, as clearly illustrated in Fig. 1 of the drawing. The conical container is provided at its upper edge with an outwardly extending horizontally disposed annular rim 3 and it forms a lower contact which cooperates with an upper contact 4 consisting substantially of a metal disc forming a cover for the mercury container and spaced from the rim 3 of the container by a ring 5 of insulating material. The insulating ring 5 which is interposed between the rim 3 and the upper contact plate 4 may be composed of any suitable insulation and cement which securely mounts the upper contact or cover plate 4 in a fixed position upon the rim of the mercury container, the mercury being sealed within the container by the insulating ring.

The conical mercury container is provided at one side with an inverted approximately L-shaped arm 6 consisting of a horizontal top portion and a depending vertical portion 7 to which is secured a horizontal binding post 8 carrying an inner polygonal nut 9 and an outer nut 10 having a knurled portion 11 and adapted to cooperate with the inner nut 9 for securing a wire to the binding post 8 for electrically connecting the same with the primary circuit of a conventional ignition system of an automobile or other motor vehicle, a tractor or other motor propelled machine.

The upper contact or cover plate 4 is provided with an inverted approximately L-shaped arm 12 consisting of a horizontal portion and a depending vertical portion 13 to which is secured one end of a binding post 14 located diametrically opposite the binding post 8 and provided with an inner polygonal nut 15 and a cooperating outer nut 16 having a knurled portion 17 and adapted to receive a wire for conveniently grounding the binding post 14, whereby when a vehicle or machine to which the mercury switch is applied departs from a predetermined number of degrees from the horizontal in any direction, either longitudinally or laterally, the pool of mercury will be caused to flow outwardly from the bottom of the conical cup to the top thereof and electrically connect the lower contact or container 1 and the upper contact or cover plate 4 and ground the primary circuit of the ignition system and stop the engine without any exterior spark so that the possibility of fire caused by an ignition spark will be completely eliminated. Also the stopping of the engine of a tractor or similar machine will prevent accidental overturning of the same due to sudden drawbar overloads or attempting to negotiate excessive gradients.

The mercury switch may be conveniently supported in a horizontal position by a short metal bracket 18, preferably consisting of a piece of heavy sheet metal provided at its ends with holes 19 and 20. The upper hole is adapted to receive the binding post 8 and the nuts 9 and 10 thereof will enable the mercury switch to be clamped to the upper end of the bracket 18 when the same is arranged in a vertical position and the lower hole 20 of the bracket is adapted to receive the binding post of the primary circuit of a magneto 21, diagrammatically indicated in Fig. 4 of the drawings. The other binding post 14 of the mercury switch may be connected by a wire 22 to the nearest convenient ground which may be a grounding switch 23, but the binding post 14 may be grounded in any other suitable manner such as by means of a short wire electrically connected with the chassis or frame of the tractor.

It has been found for all practical purposes that if the conical mercury receiving cup or container has its inclined sides or walls arranged to cause the mercury to flow from the bottom of the cup to the top thereof when the conical cup is tipped over approximately 40° from its normal upright position, it will prevent tractors from tipping over and overturned vehicles such as automobiles and trucks from catching fire from ignition spark.

Figure 4:
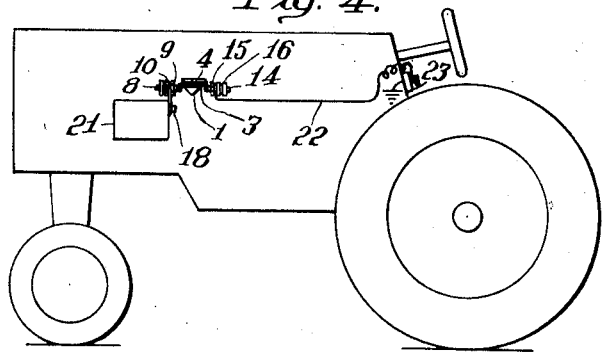
Fig. 4 is an elevation of a portion of a tractor showing more or less diagrammatically the mounting of the mercury switch on the magneto of the tractor.

The grounding switch 23 which is arranged on the dash of the tractor is adapted for shutting off the magneto in the usual manner and the mercury switch which is arranged in parallel with the switch 23 is grounded by the short wire 24, as indicated in Fig. 4 of the drawing, so that the magneto will be grounded by the tipping of the tractor.

I claim:

A mercury switch for grounding the primary circuit of an ignition system comprising a metal cup of inverted conical shape constituting a mercury container open at its top and forming a lower contact, a pool of mercury in said cup normally disposed at the bottom thereof and being freely movable along the wall of the cup toward the top thereof when the cup is tilted from a normally upright position toward an inverted position, an outstanding annular rim extending about the open top of the cup and carried by the wall, a metal cover for the cup consisting of a disk completely closing the top of the cup and having a marginal portion entirely about its circumference disposed over and supported by said rim, said disk constituting an upper contact engageable at any point about its circumference by the mercury when the cup is tilted toward an inverted position, a continuous annular ring of insulating material resting on the rim and interposed between the said rim and the overlapping marginal portion of the cover and adheringly secured thereto and forming a sealed joint between the cup and the cover, arms extending outwardly and downwardly from the cover and the rim in rigid connection therewith and spaced from each other circumferentially thereof, binding posts carried by and extending outwardly from the depending portions of said arms, and a bracket having one end detachably mounted about one binding post and its other end adapted for detachable connection with the binding post of the primary circuit of a magneto whereby the mercury switch is supported thereon.

HOWARD N. BURROUGHS.

References Cited in the file of this patent

UNITED STATES PATENTS

| Number | Name | Date |
|---|---|---|
| 1,107,245 | Bard | Aug. 18, 1914 |
| 1,915,267 | Bigelow | June 27, 1933 |
| 2,365,262 | Gair | Dec. 19, 1944 |